United States Patent [19]

Mussino et al.

[11] Patent Number: 5,432,507
[45] Date of Patent: Jul. 11, 1995

[54] METHOD AND NETWORK FOR OPERATING A DISTRIBUTION NETWORK

[75] Inventors: Franco Mussino; Marco Roccato, both of Turin, Italy

[73] Assignee: Societa' Italiana Per Il Gas P.A., Turin, Italy

[21] Appl. No.: 140,785

[22] Filed: Oct. 21, 1993

[30] Foreign Application Priority Data

Oct. 27, 1992 [IT] Italy .............................. TO92A0865

[51] Int. Cl.⁶ .................... G08C 17/02; H04Q 7/00
[52] U.S. Cl. ...................... 340/870.03; 340/825.54; 340/870.07
[58] Field of Search .......... 340/505, 825.54, 825.55, 340/870.01, 870.02, 870.03, 870.05, 870.07, 870.08

[56] References Cited

U.S. PATENT DOCUMENTS

| | | | |
|---|---|---|---|
| 4,213,119 | 7/1980 | Ward et al. ..................... | 340/870.02 |
| 4,301,444 | 11/1981 | Bruckert et al. ................ | 340/870.02 |
| 4,388,690 | 6/1983 | Lumsden ......................... | 340/825.07 |
| 4,628,313 | 12/1986 | Gombrich et al. .............. | 340/870.02 |
| 4,779,839 | 10/1988 | Sears ................................ | 340/825.54 |
| 5,056,107 | 10/1991 | Johnson et al. ................. | 340/870.03 |
| 5,107,440 | 4/1992 | Callahan et al. ................ | 340/870.02 |
| 5,179,569 | 1/1993 | Sawyer ............................ | 340/870.03 |

*Primary Examiner*—John K. Peng
*Assistant Examiner*—Daniel J. Wu
*Attorney, Agent, or Firm*—Herbert Dubno

[57] ABSTRACT

A method for the improvement of distribution network management, in particular of a gas, water, electric energy or heat network that provides the possibility of telemetry of data by means of a central station and a plurality of peripheral stations connected to the central station. The relevant data is subsected to simultaneous reading of a plurality of peripheral stations and the successive transmission of such data to the central station.

17 Claims, 5 Drawing Sheets

| PARAMETERS | VALUES |
|---|---|
| * Spread specrum transmission<br>- DS (Direct Sequence): occupied band<br>- FH (Frequency Hopping) : channeling<br>                               channel numbers | 3 MHz<br>25 kHz<br>120 |
| TRANSMITTER<br>* Work frequency        (simplex)<br>                         (duplex)<br>         or      (duplex)<br>* Carrier frequency tollerance<br>* Irradiated power<br>* Modulation type<br>* Digit frequency of the numeric module<br>* Characteristics of the filter in base-band:<br>    - Frequency loss at 6 dB<br>    - Roll-off<br><br>* Maximum transmission duration<br>* Minimum interval between two transmissions<br><br>* Improper adjacent channels level(FH)<br>* Non essential irradiation levels:<br>  band: 100 kHz - 2000MHz | 440 - 443 MHz<br>400 - 403 MHz<br>309 - 312 MHz<br>± 2,5 kHz<br>1 mW<br>ASK o FSK o PSK<br>9.600 bits/s<br><br>4.800 Hz<br>0,5<br><br>0,5 s<br>5 s<br><br>0,2 µW<br><br>0,25 µW |
| RECEIVER<br>* Work frequency (simplex o duplex)<br>* Sensitivity<br>* Selectivity (DS: 1,25 Mbit/s)<br>    band loss of 6 dB<br>    band loss of 50 dB<br>    band loss of 70 dB<br>* Selectivity (FH: canale band: 10kHz)<br>    band loss of 6dB<br>    band loss of 50dB<br>    band loss of 70 dB<br><br>* Improper radiation levels<br>    band: 100 kHz - 2000MHz | 440 - 443 MHz<br>-60dB (mW) (220µV)<br><br>1,3 MHz<br>2,5 MHz<br>3,0 MHz<br><br>12,0 kHz<br>21,0 kHz<br>25,0 kHz<br><br>2 nW |

FIG. 5

| PARAMETERS | VALUES |
|---|---|
| * Spread spectrum transmission | |
| - DS (Direct Sequence): band width | 3 MHz |
| - FH (Frequency Hopping) : channel band width | 25 kHz |
|                           number of channels | 120 |
| TRANSMITTER | |
| * Carrier frequency band (simplex o duplex) | 440 - 443 MHz |
| * Carrier frequency tollerance | ± 2,5 kHz |
| * Transmitted power | 10 - 20 W |
| * Modulation type | ASK o FSK o PSK |
| * Modulation bit-rate | 9.600 bits/s |
| * Characteristics of the filter in base-band: | |
|     - Frequency at 6 dB loss | 4.800 Hz |
|     - Roll-off: | 0,5 |
| * Minimum duration of transmission | 2,0 s |
| * Minimum interval between two transmissions | 5,0 s |
| * Adjacent channels spurious level(FH) (with reference to the level of the non modulated carrier) | -70 dB |
| * Non essential radiations level: band: 100 kHz - 2000MHz | 0,25 µW |
| RECEIVER | 440 - 443 MHz |
| * Carrier frequency band    (simplex ) | 400 - 403 MHz |
|      "       "       (duplex) or | 309 - 312 MHz |
|      "       "       (duplex) | |
| * Sensitivity | -110dB (mW) (.7µV) |
| * Selectivity (DS: 1,25 Mbit/s) | |
|     6 dB loss band width | 1,3 MHz |
|     50 dB loss band width | 2,5 MHz |
|     70 dB loss band width | 3,0 MHz |
| * Selectivity (FH: channel band: 10kHz) | |
|     6 dB loss band width | 12,0 kHz |
|     50 dB loss band width | 21,0 kHz |
|     70 dB loss band width | 25,0 kHz |
| * Spurious radiations level | |
|     band: 100 kHz - 2000MHz | 2 nW |

FIG. 6

| PARAMETERS | VALUES |
|---|---|
| BATTERY | |
|     Voltage | 3,6 V |
|     Current delivery | 1,5 Ah |
| TRANSMITTER | |
|     Transmission consumption (0,5s) | 30 mA |
| RECEIVER | |
|     Receiving consumption (0,1s) | 0,2 mA |
|     Rest consumption (1,9s) | 5 µA |

| PARAMETERS | VALUES |
|---|---|
| BATTERY | |
|     Voltage | 12 V |
|     Current delivery | 10 Ah |
| TRANSCEIVER | |
|     Transmission consumption | 3 A |
|     Receiving consumption | 10 mA |
| MODEM or TOV | |
|     Transmission consumption (90 s) | 300 mA |
|     Receiving consumption | 10 mA |

FIG. 7

METHOD AND NETWORK FOR OPERATING A DISTRIBUTION NETWORK

SPECIFICATION

1. Field of the Invention

The present invention refers to a method of operating a distribution network, and, more particularly to the improvement of distribution network management, especially gas, water, electric energy, heat, that provides the possibility of telemetry of data by means of a central station and a plurality of peripheral stations connected to the central station.

2. Background of the Invention There are known telemetry systems via radio that provide a central station and a plurality of associated peripheral stations with transceivers or "transponders" that transmit via radio the consumption information to the central station and receive commands or messages.

To avoid the necessity of using high power transmitting peripheral stations, it is known the possibility of utilising an a vehicle can be used for retrieving the information from peripheral stations and then sending it to the central station. Systems of this type are for example described in the European Patent Application n. 0 428 322 and in the British Patent Application n. 2 237 910.

Such systems have the drawback of requiring one or more appropriately equipped vehicles that continually retrieve data from different peripheral stations; this means that the data is available only after a programmed run has been completed. Furthermore the vehicle makes only temporary connections with each peripheral station. The system has considerable problems when it is desired to carry out simultaneous consumption or flow surveys from a given plurality of peripheral stations because they would have to be interrogated at successive times.

OBJECT OF THE INVENTION

The object of the present invention is to provide a method for the improvement of distribution networks management that eliminates the aforementioned drawbacks of the known systems.

SUMMARY OF THE INVENTION

This object is achieved according to the present invention in a method of operating a distribution network, in particular a gas, water, electric energy, or heat distribution network, that provides the possibility of telemetry of data by means of a central station and a plurality of peripheral stations connected to the central station. According to the invention simultaneous readings of a plurality of peripheral stations are effected and the transmission of such data to the central station is effected.

BRIEF DESCRIPTION OF THE DRAWING

The above and other objects, features, and advantages will become more readily apparent from the following description, reference being made to the accompanying drawing in which:

FIG. 5 is a table with the electrical characteristics of the transceiver for the peripheral units;

FIG. 6 is a table with the electrical characteristics of the transceiver for the concentrator; and FIG. 7 represents two tables with consumption examples of batteries for the peripheral units and the concentrator.

SPECIFIC DESCRIPTION

The invention is based on the idea of executing a contemporary survey, at a determined instant, of consumption, or of the flow rate, by means of a certain plurality of peripheral units (for example all those of a zone supplied by a well defined part of the distribution network). The survey may be executed by said peripheral units based on a command generated from the central station to all the interested peripheral stations, of the type: detect the consumption at 12:00 o'clock and memorize the data; repeat the detection at 12:10 and memorise the data; all the detections will be executed by the peripheral units at the given hours; memorised data will then be successively gathered by the central station, that will interrogate all the interested peripheral units in succession.

The difference between consumption data retrieved in the two established instants provides the effective consumption in the considered period of time. The sum of consumption thus metered by the different meters provides the overall consumption in the time period placed under control and can then be compared with the metered central consumption (or with metered data relative to the supply points of the distribution network), in order to determine, for example, whether there are losses in the network or if there is improper consumption that is not detected by the meters.

It is clear that with a similar method the flow, rather than the consumption can be detected: in this case the two successive readings must take place in close periods of time.

A realisational example of the method according to the invention will now be described in detail.

1) INTRODUCTION

Figure 1:
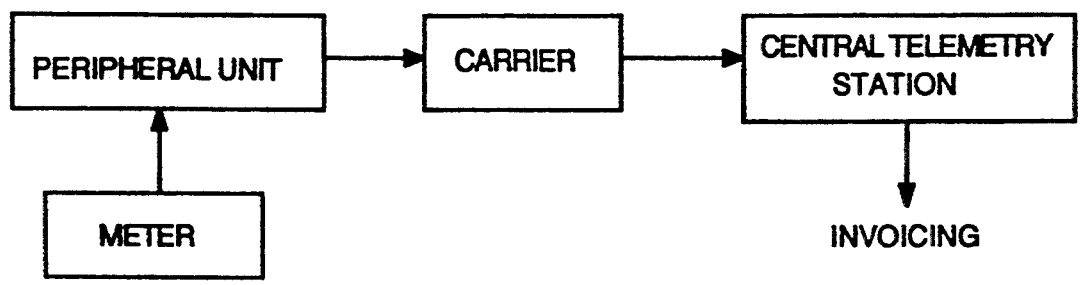
FIG. 1 is an overall block diagram of a telemetry system for the method of the invention.

A telemetry system of gas and water meters (but applicable also to those of electric energy or others which are similar) is constituted from the following main parts (note FIG. 1):

a) an apparatus located near the meter, referred to as "Peripheral Unit", having the function of an interface with the transmission means or "carrier";

b) a centralized data gathering apparatus, named "Central Telemetry Station" (PCT), the function of which consists in collecting the readings and making them available to the invoicing system; and c) transmission means or "carrier", which can also be of the "mixed" type (i.e. that uses several kinds of carriers), able to convey acquired data from the Peripheral Unit in the direction of the Central Telemetry Station.

Transmission means or "carriers" used in telemetry systems of meters can be of different types depending on the type of usage (domestic or industrial) and also in relation with other eventual services that can be carried out together with the telemetry.

The "carriers" available today for telemetry can be distinguished in two large categories:
 those utilizing a physical support for propagation (cable or optical fiber); and
 those utilizing a so-called "broadcast" (radio waves) for the propagation.

To the first category belong the telemetry systems that use as a carrier:
 A switched telephone line
 A dedicated line
 A low voltage (BT) or medium voltage (MT) electric line
 A high diffusion telematic network (Argotel network)
 The bi-directional CATV networks
 Optical fibers To the second category belong the telemetry systems that use as a carrier radio waves, through a:
 mobile means (for example, motor vehicle or "van") or a
 fixed and centralized system.

The telemetry system that is herein employed for the implementation of the improved management method considers domestic users, via a fixed system. It is therefore opportune that data relative to several meters be concentrated within respective apparatuses (said concentrators) before being sent to the PCT.

The concentration operation is advantageous for operative reasons, and above all for reasons of installation and management costs.

Thus, the "path" that supplies data from the meter or (more precisely) from the Peripheral Unit towards the Central Telemetry Station is constituted by two links wherein "carriers" of different types are used.
 Such "carriers" can be of two classes:
 primary carriers, that transport the concentrated data to the direction of the Central Telemetry Station,
 secondary carriers, that for technical characteristics and economic reasons (low cost), are usable for transporting data from the Peripheral Unit, arranged within the meter, to the concentrator, after which the transportation takes place by the primary carrier.

For domestic telemetry the carriers which are more suitable, both from a technical viewpoint (speed of transmission and reliability of the reading), and from an economic viewpoint, are:
 among the secondary carriers: radio waves
 among the primary carriers: the ARGOTEL network.

The description regards essentially apparatuses utilising the connection via radio waves; for simplicity sake the connection through the Argotel is not treated here, the implications of which have been taken into account only where necessary.

It is clear that the connection between concentrators and the Central Telemetry Station may be obtained with other means, which are different from the Argotel network, such as:
 switched telephone network,
 dedicated lines,
 optical fibers,
 radio links,
 low voltage or medium voltage electric lines,
 cellular telephone,
 ISDN networks (Integrated Service Digital Network),
 bi-directional CATV networks.

As the methodologies of use of such carriers and the relative technologies are known, specific descriptions are not herein supplied.

2) FUNCTIONS OF THE TELEMETRY SYSTEM

The installation of a communication system between the Service Provider (gas, water, etc.) and the user by means of a telemetry system, allows other functions to be made available, besides the telemetry itself, that can be distinguished in two large categories:
 a) Basic services that interest mainly the Service Provider, also improving the quality of the service itself for the users;
 b) Additional services, that interest mainly the user and for which the user agrees to pay.

To obtain the maximum flexibility relative to the basic and additional services, it is necessary that the communication be of the bi-directional type.

In particular the basic services that a communication system between the Service Provider and the user can carry out are:
 Telemetry with the aim of invoicing
 Telemetry for technical purposes in order to improve the distribution service
 Security
 User relations
 Telemetry of other supplies.

3) ARCHITECTURE OF THE TELEMETRY SYSTEM

Figure 2:
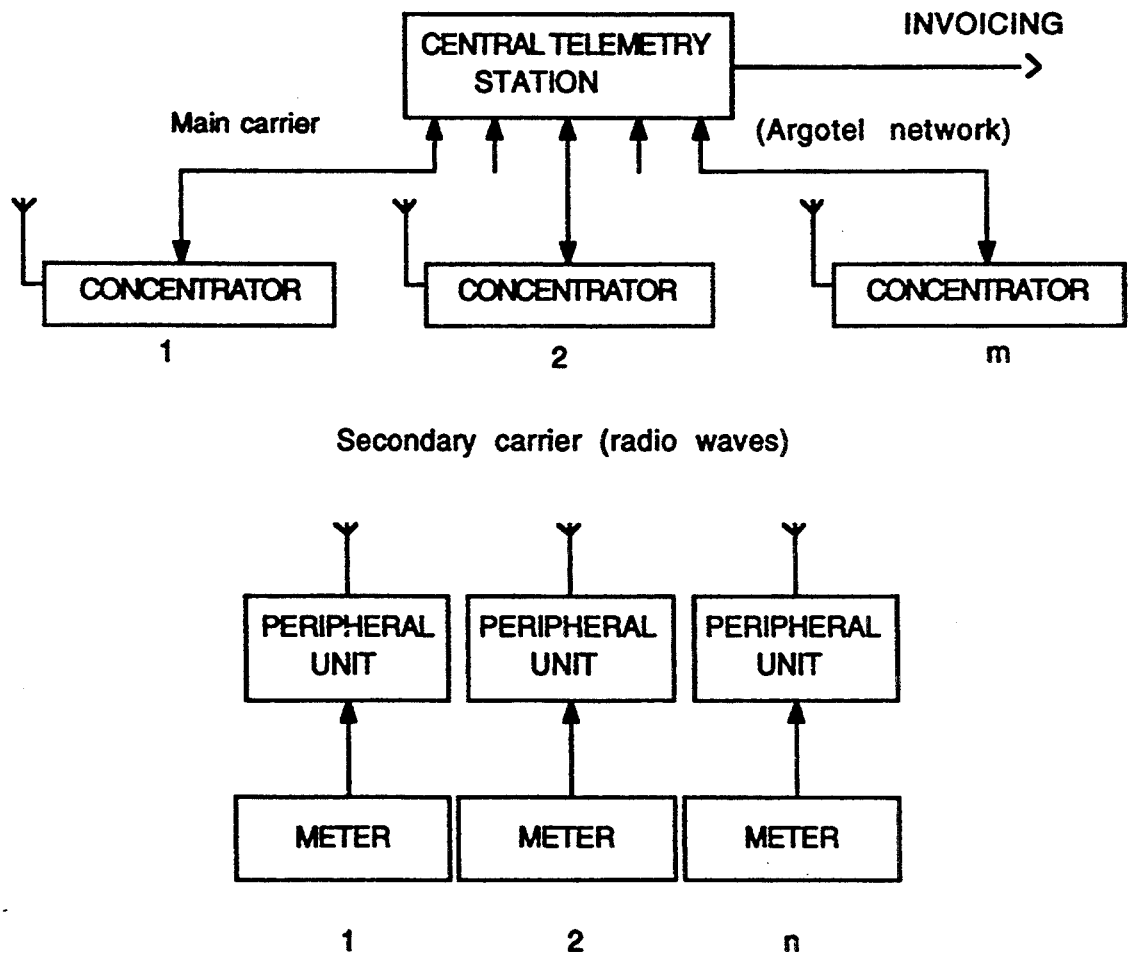
FIG. 2 is a block diagram which represents the general configuration of a telemetry system with particular transmission means according to the invention.

The structure or architecture of the telemetry system must be such to allow the following functions;
 telemetry
 basic services
 additional services 3.1 - Block diagram The general diagram of the telemetry system according to the invention is represented in FIG. 2, where one can see how the telemetry Peripheral Unit works as a communication interface towards the meter, while the connection of the concentrator with the Central Telemetry Station takes place through the Argotel network.

3.2 - Information to be transmitted

The information to be transmitted between the Peripheral Unit or the Multi-service Terminal and the PCT are the following:
 the meter reading, with the associated identification of the meter, data relative to the Service Provider and to the type of delivery;
 data supplied by sensors of different types (temperature, smoke, etc.)
 commands and data sent from the PCT, to actuators or to display information;
 It is however necessary to distinguish between:
 messages relative only to telemetry,
 messages relative to sensors and actuators
 messages relative to the Multi-service Terminal (additional services and tele-management)
 special messages.

The message relative to the telemetry to be transmitted from the Peripheral Unit towards the PCT can be contained in 128 bits, subdivided, for example, in the following way:
 two bits (sequence 1,0) of "start"
 preamble (24 bits) for carrying out the synchronization of the receiver
 identification code of the meter (32 bits: 8 digits BCD), i.e. of the user meter type (gas, water, electric energy, heat, air conditioner, hot water, etc.) (4 bits: 1 digit BCD)
consumption (32 bits: 8 digits BCD)
flow-rate (12 bits: 3 digits BCD)
signalling of tampering, errors, overflow, state of supply or batteries, etc. (4 bits: 16 signalling kinds)
correction code of errors (CRC) and cryptographic keys (16 bits)
further information (2 bits)

The quantity of transmitted information by means of the 128 bits can be increased by adopting a binary codification, instead of that in BCD.

The messages relative to the information generated by sensors connected to the Peripheral Unit or to proceed to actuators (also connected to the Peripheral Unit) may still have the structure or the shape previously indicated, simply replacing the bit relative to the meter type, consumption, flow rate and tampering, (in total 52 bits) with specific messages and i.e.:

for sensors:
identification of the sensor (8 bits) (256 sensors)
value of the parameter (16 bits) (4 digits BCD)
priority (4 bits)
other information and error correction code (24 bits)
for actuators:
identification of the actuator (8 bits) (256 actuators)
intervention type (4 bits)
value of the parameter on which to intervene (16 bits)(4 digits BCD)
other information and error correction code (24 bits).

3.3 - Conversation protocols

The actual conversation protocols are not reported here, but only indications of criteria and procedures with which the exchange of information between the different units of the telemetry system must take place. The information to be transmitted has been previously indicated.

The transmission between the Peripheral Unit and the Concentrator can take place with different procedures depending on the type of message exchanged.

For messages relative to the telemetry only, the transmission of the information (reading) takes place on request of the Concentrator. Such a request can be directed to all the Peripheral Units connected to the Concentrator, or only to one of them.

For messages relative to the sensors and actuators (basic services), the transmission can be generated:
by the Peripheral Unit, for example, in the case of alarms coming from specific sensors (temperature, etc.) or
by the PCT, that through the Concentrator, is able to operate on specific actuators (for example, shutdown the gas valve) or requires readings to be carried out by means of which it extracts data relative to the functioning of the distribution network.

In both cases it is desired that the message generated receives an answer in order to certifify the correct reception of such message.

4) FUNCTIONAL AND STRUCTURAL CHARACTERISTICS

The considerations made have demonstrated that the architecture of the telemetry system must take account of the basic services; thus, the functions that the main parts of the system must carry out are examined and in particular:
the Peripheral Unit
the Concentrator having previously shown in a summarised form the functions of the Central Telemetry Station, which is not treated here in a specific way.

4.1 - PERIPHERAL UNIT 4.1.1 - Functions

The Peripheral Unit is arranged within the meter and the following main functions:
acquire the reading, i.e. the information relative to the consumption (gas, water, etc.), by way of absolute "encoder" or incremental "encoder";
memorize the reading, while waiting to send it to the Concentrator (and from this to the PCT) or for carrying out specific elaborations; the capacity of the memory should be sized depending of the type and of the number of functions provided;
send the reading to a centralized apparatus or Concentrator, on request of the latter;
give information to the user through a "display" relative to consumption, tariffs, etc.;
receive information from specific sensors (for example, gas pressure, flow-rate in a determined instant, minimum and maximum flow in a determined period, temperature, etc.) and
operate actuators (for example, closure of the gas valve, etc.)

4.1.2 - Structure

Figure 3:
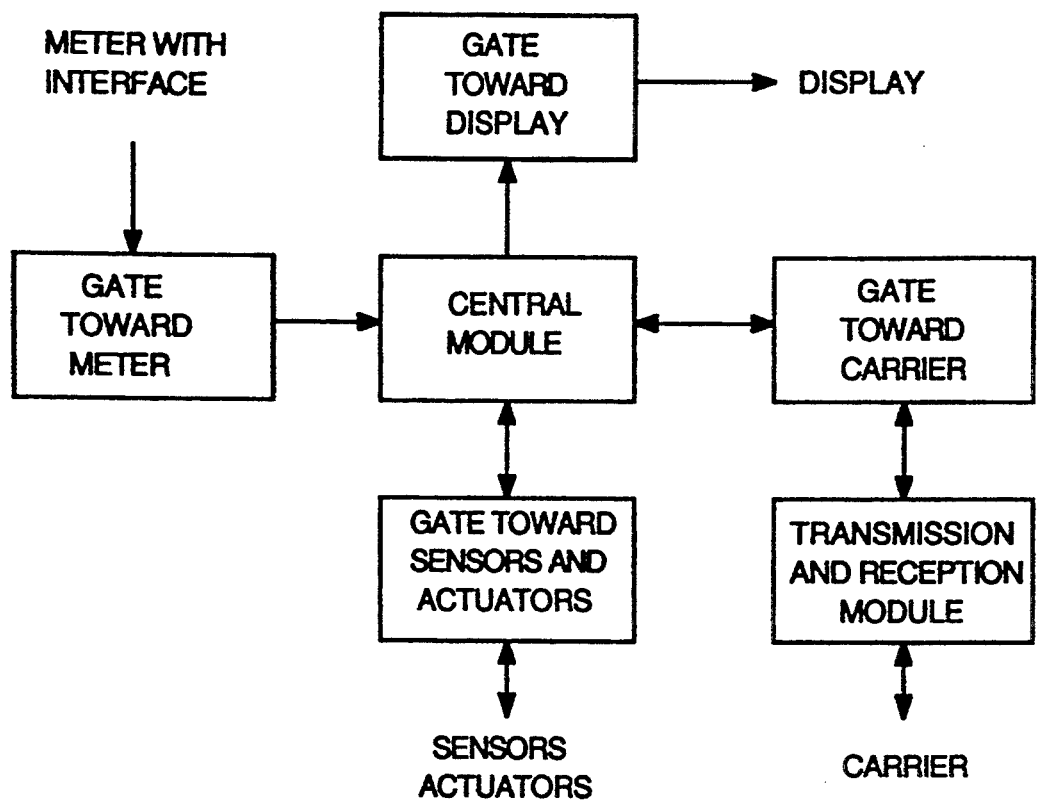
FIG. 3 is a block diagram of a peripheral unit according to the invention.

The Peripheral Unit, having to be able to operate with all the possible structures of the telemetry system while maintaining a minimum cost, can be subdivided into modules, in order to execute the main functions within the central module (constituted by the information processor and by the memory) and to allow the addition of other modules for further functions. FIG. 3 illustrates the block diagram of the Peripheral Unit, where the modules around the central module, constituted by a processor and a memory are indicated.

Obviously, the complexity of the central module and of the peripheral ones must be optimized so as to make the entire system economically acceptable and easily manageable.

A display screen can be provided on the same meter, but in that case its reading can be difficult for the user (for example, in the case wherein the meter is arranged in battery (one after the other or closed in an external cabinet). It is therefore desired to provide the possibility of arranging it in a favorable position for its reading by the user, installing a suitable connection by means of a cable, the cost of which should be carefully evaluated considering the installation problems.

4.1.3 - Central module

The central module uses a microprocessor system that makes the different functions according to established procedures. It is also equipped with a memory both for the data to be sent to the telemetry system, and for elaborating the acquired information. The main information acquired is:
the reading of the meter, with associated identification of the meter, of the Service Provider and supply type;
data supplied by sensors of different values (as previously indicated);
the commands and data coming from the PCT through the carrier, for acting on actuators or for displaying information;

The information delivered to the central module must be duly elaborated for:
forming the message to transmit to the PCT,
interpreting data retrieved by the sensors, acting on appropriate actuators (for example, the gas interception valve), displaying information (reading, tariffs, various messages, etc.) on a display.

The central module, together with the various gates in the direction of the meter, the carrier, sensors and actuators, can be constituted by a "custom chip" containing the microprocessor, the ROM memories (Read Only Memory) and RAM (Random Access Memory) for the program and data, respectively.

The capacity of the RAM memory must be of at least 2 kbyte, so as to contain at least 100 readings, whereas the ROM memory can be of a lower capacity, depending of the complexity of the program to be executed.

It is very important that such module is built in a C-MOS technology in order that consumption of the battery is reduced to the minimum.

4.1.4 - Interface with the meter

The interface with the meter must take into account that the measuring of the consumption, i.e. the information relative to the "reading" can be obtained with two different techniques:

"the incremental encoder" (connected to the dial (or roller) relative to the digit of the unit (or submultiple) of the "meter"), that generates electric impulses, of low frequency;

"the absolute encoder", that simultaneously "reads" the position of all the dials of the meter.

Each of the two systems has advantages and defects. Thus, the interface with the meter must:

be versatile, i.e. be adaptable with both kinds of "encoder", absolute and incremental be installed directly within the meter, in the sealed section, in order that it cannot be tampered or altered contain data relative to the registration number of the meter and to the delivery type (gas, water, heat, electric energy)

adaptable in the case of meters installed in battery (one after the other), i.e. consent to place in parallel the output data, utilizing a connection similar to the RS 485 type, but with a much lower current consumption.

It is also opportune that such interface can be adapted to portable terminals, until the actual telemetry system is eventually installed.

4.1.5 - Interfaces with the carrier

The interface with the carrier is constituted by a transmission and reception module using a serial port both for the output information (transmission), or for the input information (reception), i.e. that come from or that is directed towards the central module.

The transmission and reception module is constituted by a transmitter and a radio receiver, i.e. a "transponder" or transceiver, the electrical characteristics of which are reported later in point 5.

4.1.6 - Interfaces for sensors and actuators

In the case wherein the Peripheral Unit also has to operate for executing operations relative to the basic services (note point 2.1), it is necessary that it be equipped with an additional module containing:

a system for decoding messages transmitted by the "Central Telemetry Station" (PCT), to be sent to actuators by way of appropriate connections;

one or more connections that accept incoming signals from sensors and a coder of the acquired information; such information can be of a numeric type or in binary form (for example, obtained by a switch opened or closed), but may also be of analog type (for example, a temperature) to be transformed in numerical form, through a A/D (Analog/Digital) converter.

means for blocking the delivery of the supply (in particular gas, water, electric energy, heat) after fraud, tampering, arrears, earthquake, fire or other calamities.

4.2 - CONCENTRATOR 4.2.1 - Functions

The Concentrator (see FIG. 4) has the task of:

collecting the information (readings, signals, alarms. etc.) sent by the Peripheral Unit;

sending to the Peripheral Unit the information or the commands transmitted by the PCT.

Therefore, the Concentrator has the function to both effectively concentrate the information sent by the Peripheral Units, and also to sort between such units the information coming from the PCT.

4.2.2 - Structure

To carry out the aforementioned functions, the structure of the Concentrator must be constituted by:

a central module equipped with both intelligence (obtained by means of a duly programmed microprocessor), and with a memory sufficient for containing the information to be exchanged with the PCT and with the Peripheral Unit interfaces both with the primary carrier (in the direction of the Central Telemetry Station), and with the secondary carrier (in the direction of the Peripheral Units).

Figure 4:
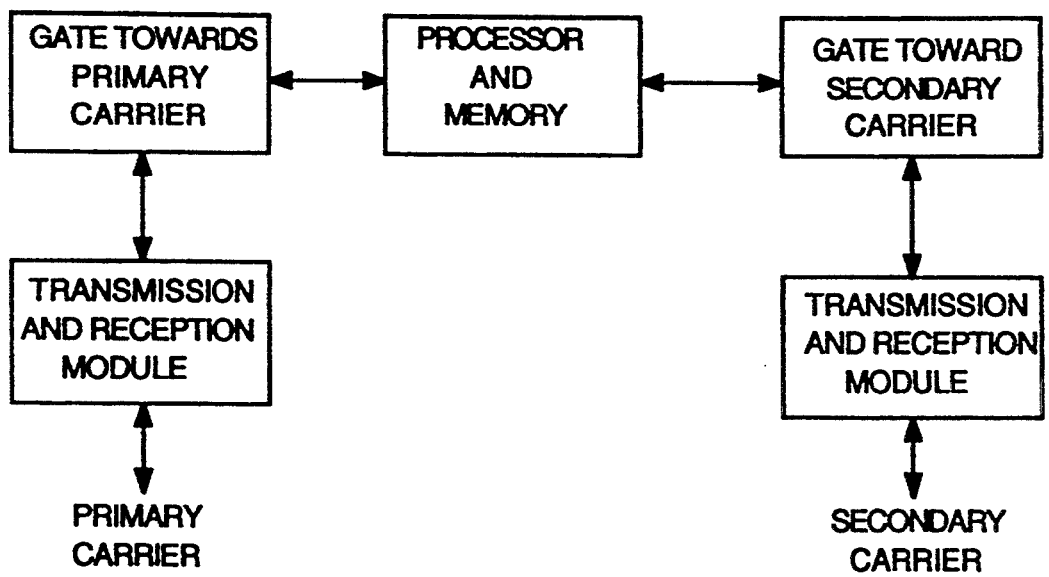
FIG. 4 is a block diagram of a concentrator according to the invention.

Thus, the general block diagram of the concentrator is that as reported in FIG. 4.

4.2.4 - Central module

The central module of the Concentrator is constituted by:

a microprocessor, with a suitable management program of the communication system for collecting data coming from the Peripheral Units to be sent to the PCT and for sorting the data coming from the PCT in the direction of the Peripheral Units, a memory of adequate size (at least 64 kbyte), able to contain:

the information relative to 20 readings (128 bits each) or equivalent, coming from 200 Peripheral Units;

the information coming from the PCT, to be sorted among the various Peripheral Unit.

As it is considered appropriate that the information exchanges through the Concentrator are tagged with specific codes for every type of operation and with a progressive number (or, preferably, with the date and hour), the required size of the memory can be doubled if compared to the aforementioned minimum size, i.e. a memory capacity being equal to at least 128 kbyte is required.

4.2.5 - Interface with the primary carrier

The interface in the direction of the primary carrier (Argotel network) can be managed through an asynchronous serial communication port (for example of the type EIA RS 232 or CCITT V24/V28) or synchronous (EIA RS 422 or CCITT V24/V11), depending on the type of TOV (Terminal Over Voice) used.

The transmission speed of the information (bit-rate) on the primary carrier should be of 4800 bits/s.

The transmission and reception module is the "Over Voice" Terminal (TOV), because the primary carrier constituted by the Argotel network.

The electrical characteristics and the conversation protocol are those provided for such type of apparatus and are not herein reported.

4.2.6 - Interface with the secondary carrier

The interface with the secondary carrier is also constituted by a serial port, the conversation protocol of which must be coherent with that of the Peripheral Unit (note par. 3.3). The transmission and reception module is actually a transceiver, the main electrical characteristics of which are reported in paragraph 5.

5) ELECTRICAL CHARACTERISTICS

The principal electrical characteristics of apparatuses utilised for the telemetry are herein reported and mainly those regarding:

- the connection via radio of the Concentrator with the Peripheral Unit;
- consumption of the batteries feeding the Peripheral Unit and the Concentrator.

5.1 - Characteristics of the connection via radio

As stated the connection via radio must:

- be of a bi-directional type in order to allow, besides the reading of the meter (for which a single direction connection would be sufficient), also the management of other basic services and teleservices,
- allow operative modes of the simplex and duplex type,
- avoid problems due to multipath propagation, using spread spectrum transmission techniques, the band occupation of the connection can not be contained within a single telephone channel (for example of 25 kHz), but requires an extended band of at least 2–3 MHz, with spread spectrum transmission techniques such as DS (Direct Sequence) or FH (Frequency Hopping).

The first transmission technique (DS) reduces the spectral density of the transmitted signal, thus reducing the interference on the single telephone channel (of 25 kHz), eventually interfered.

The second transmission technique (FH) occupies sequentially and for very short times channels of 25 kHz, obtaining, also in this case a reduction of the disturbance on the single telephone channel.

If the connection is of the simplex type, it is sufficient to allocate only one band of 2–3 MHz, while for duplex connections it is necessary to allocate two bands of 2–3 MHz each, having a distance at least 10–20% of the central frequency of the band. Taking into account that the electrical characteristics of transceiver apparatuses within the meter (Peripheral Unit) depend on the cost constrains and on the consumption of the battery, besides miniaturising, it is clear in such case that small transmission powers must be employed (e.g. 1 mW), while the obtainable sensitivity of the receiver is low (for example, $-60$ dB(mW):=220 mV).

The characteristics of transceiver apparatuses within the Multi-service Terminal have similar requirements, even if not in such a restrictive way, being able to provide the re-charging of the batteries.

For the transceiver apparatuses within the Concentrator it is possible to use higher transmission powers (for example, 10–20 W) and higher receiver sensitivity (for example, $-110$ dB(mW):~0.7 mV).

In the tables of the FIGS. 5 and 6 the main values of such characteristics have been reported, in order to be used by the designer; the data reported in the tables is provisional data and it will be possible to carry out eventual modifications concerning the structure of the transceiver apparatus, or concerning the spread spectrum transmission system.

5.2 - Consumption 5.2.1 - Peripheral Unit

As the secondary carrier is constituted by radio waves, the Peripheral Unit must be equipped with autonomous supply, by way of batteries; thus, the consumption of electronic devices contained within it must be minimised in order to allow a life of at least 7–8 years.

For reducing consumption the following techniques are generally employed:

- maintaining the transmission system off and that of reception in a condition of minimum consumption
- periodically activating the receiving system only for a short time, for example for 0,1 s every 2 s, i.e. for a twentieth of the time.

Such solution does not reduce the answering readiness of the system, which however remains ensured, as the maximum waiting time is of 2 s.

An example of the battery consumption for obtaining the requested autonomy is reported in the first table of the FIG. 7. Based on such values it is possible to estimate the battery life, supposing that this can supply 1,5 Ah.

If the battery energy can be exploited for the 70% of its nominal value, its duration may reach 8 years.

5.2.2 - Concentrator

The supply of the Concentrator is provided through the electricity network, with a buffer battery, able to ensure the functioning of the system, in absence of the mains, for a time in the order of 10–12 days, so as to be able to:

- forward important signals (for example, temperature, fire alarms, etc.) of the tele-managed system;
- execute urgent interventions (for example, supply the gas closure valve, activate the actuators of the tele-managed system, etc.).

In the second table of the FIG. 7 the most important values are reported relative to the consumption of the transceiver, and of the modem or TOV.

Taking into account such values and supposing that:

- the telemetry of all the meters is not carried out due to lack of electric energy in a certain geographic area, while the lack of the mains is promptly signalled to the PCT,
- the requests of tele-management and teleservices can be fulfilled only a number of times (at least 10) during such interventions, the duration of the transmission via radio being of 2 s of time, while that by the "modem" can last up to 90 s,
- the receiver is always active, as also is the "modem" or TOV connected to the primary carrier, it is deduced that the duration of the battery can last up to 12 days.

6) DIMENSIONAL SPECIFICATIONS

As an explanatory example the overall dimensions of the single units are herein reported.

The sizes are milimeters (mm) and relates to:

Length (l), depth (p), height (h).

6.1 -Peripheral Unit

Overall dimensions of the Peripheral Unit:

l=130 mm, p=90 mm, h=90 mm.

6.2 - Concentrator

Overall dimensions of the concentrator:

l=250 mm, p=150 mm, h=150 mm.

The characteristics of the management method described result in being clear from description of the supplied example.

From the above description the advantages of the method subject of the present invention are also clear.

In particular they consist in that the measuring has been made possible of an overall consumption in a determined period of time, and, as a consequence, network losses or abusive consumption are ascertained.

It is clear that the described method is more effective and reliable than those of the types known and allows to carry out new functions; as is also clear that numerous variations are possible by the skilled-man, to the method described by way of example, without departing from the novelty principles inherent in the invention.

It is clear that all the numerical indications supplied (relative to frequencies, sizes, band lengths, transmission speed, etc . . . ) are purely exemplificative and non limiting.

We claim:

1. A method of operating a distribution system having a multiplicity of meters indicating flow of a distributed medium and a central station at which distribution is controlled, said method comprising the steps of:
   (a) in response to a first command transmitted from said central station to a multiplicity of peripheral units assigned to the meters of the distribution system over a communications network interconnecting said peripheral units with said central station, at a first predetermined instant of time simultaneously reading all of the meters of said multiplicity of peripheral units by said multiplicity of peripheral units to acquire respective first data representing respective measures of flow at said meters of said multiplicity of peripheral units and at said first predetermined instant of time;
   (b) thereafter at a second predetermined instant of time simultaneously reading all of the,meters of said multiplicity of peripheral units by said multiplicity of peripheral units to acquire respective second data representing respective measures of flow at said meters of-said multiplicity of peripheral units at said second predetermined instant of time;
   (c) storing said first and second data at each of said peripheral units at least until said first and second data is transmitted to said central station;
   (d) telemetrically transmitting said data via said network from said multiplicity of peripheral units in succession and in response to interrogation signals from said central station, thereby acquiring at said central station successively from said multiplicity of peripheral units, information as to utilization of said medium in a time interval between said instants; and
   (e) comparing at said central station said information with data representing measurement of distribution of said medium to an area of said distribution system encompassing the meters of said multiplicity of peripheral units, thereby ascertaining losses in said system.

2. The method defined in claim 1, further comprising the step of blocking with selected ones of said peripheral units delivery of said medium in response to a signal from said central station transmitted over said network.

3. The method defined in claim 1, further comprising the step of blocking with selected ones of said peripheral units delivery of said medium in response to detection of an anomalous state by a sensor at the respective peripheral unit.

4. The method defined in claim 1, further comprising the step of transmitting said first and second data and said signals at least in part by radio frequency transmission over said network.

5. The method defined in claim 1, further comprising the step of concentrating data from a peripheral unit prior to transmitting said first and second data to said central station.

6. A network for controlling operation of a distribution system having a multiplicity of meters indicating flow of a distributed medium and a central station at which distribution is controlled, said network comprising:
   a multiplicity of peripheral units each assigned to a respective meter of the distribution system and capable at a first predetermined instant of time of simultaneously reading the respective meter of said multiplicity of peripheral units to acquire respective first data representing respective measures of flow at said meters of said multiplicity of peripheral units, and at a second predetermined instant of time simultaneously reading all of the meters of said multiplicity of peripheral units to acquire respective second data representing respective measures of flow at said meters of said multiplicity of peripheral units;
   a central telemetry means at said central station for transmitting signals to said peripheral units to cause said multiplicity of peripheral units to acquire said first and second data at said first and second instants of time;
   transmission means coupling said central telemetry means with said peripheral units for transmitting said first and second data from said peripheral units to said central telemetry means and said signals from said central telemetry means to said peripheral units whereby said first and second data is transmitted to said central station from said peripheral units in succession; and
   means at said central station for comparing information constituted by data with data representing measurement of distribution of said medium to an area of said distribution system encompassing the multiplicity of peripheral units, thereby ascertaining losses in said system.

7. The network defined in claim 6 wherein each of said peripheral units includes a central module interfacing with a sensor element, responsive to the respective meter, an actuator element for controlling the medium at the respective meter and a transmission and reception module operatively connected with said central telemetry means.

8. The network defined in claim 7, further comprising a concentrator between at least one of said peripheral units and said central telemetry means.

9. The network defined in claim 8 wherein said central module includes a microprocessor and a memory for said first and second data and for signals from said central telemetry means.

10. The network defined in claim 6, further comprising a concentrator between each of said peripheral units and said central telemetry means and including a processor, a memory of sufficient capacity to contain data from a plurality of said peripheral units and respective transmission and reception modules for communication with at least one of said peripheral units and with said central telemetry means.

11. The network defined in claim 6 wherein said transmission means includes a spread spectrum transceiver.

12. The network defined in claim 6 wherein said transmission means includes a switched telephone network.

13. The network defined in claim 6 wherein said transmission means includes at least one dedicated line.

14. The network defined in claim 6 wherein said transmission means includes at least one radiowave link.

15. The network defined in claim 6 wherein said transmission means includes at least one electric line.

16. The network defined in claim 6 wherein said transmission means includes a cellular telephone link.

17. The network defined in claim 6 wherein said transmission means includes a bidirectional CATV system.

* * * * *